United States Patent [19]

Hesse et al.

[11] Patent Number: 4,507,419

[45] Date of Patent: Mar. 26, 1985

[54] CONTACT ADHESIVES

[75] Inventors: Wolfgang Hesse, Taunusstein; Richard Sattelmeyer, Wiesbaden; Erich Schunck, Hochheim am Main, all of Fed. Rep. of Germany

[73] Assignee: Hoechst Aktiengesellschaft, Fed. Rep. of Germany

[21] Appl. No.: 546,391

[22] Filed: Oct. 28, 1983

[30] Foreign Application Priority Data

Nov. 2, 1982 [DE] Fed. Rep. of Germany ....... 3240396

[51] Int. Cl.$^3$ .......................... C08K 5/13; C08L 75/04
[52] U.S. Cl. ..................................... 524/327; 524/357; 524/539; 524/541; 524/590; 525/440; 525/453; 525/456
[58] Field of Search ............... 524/327, 357, 539, 590, 524/541; 528/55, 56; 525/440, 453, 456

[56] References Cited

U.S. PATENT DOCUMENTS

| 3,494,896 | 2/1970 | Aoki | 528/56 |
| 4,013,625 | 3/1977 | Wagner | 525/440 |
| 4,082,909 | 4/1978 | Sugiyama | 524/327 |
| 4,237,250 | 12/1980 | Dieterich | 525/454 |
| 4,283,500 | 8/1981 | Armstrong | 525/455 |

*Primary Examiner*—C. Warren Ivy
*Attorney, Agent, or Firm*—Charles A. Muserlian

[57] ABSTRACT

Contact adhesives based on polyurethane rubber, in which the rubber solution is combined with 2.5 to 100% by weight, based on the solid rubber, of a phenolate of titanium, zirconium and/or preferably aluminum and optionally hydroxyl group-containing compounds, and their use for bonding organic or inorganic material such as leather, polyvinyl chloride, rubber, textiles, polyurethane or glass.

12 Claims, No Drawings

CONTACT ADHESIVES

Contact adhesives are adhesives, which are generally based on synthetic rubbers, such as polyurethane rubber, polychloroprene rubber or butadiene-acrylonitrile rubber, which are mainly used in the form of organic solutions, but are occasionally also used as aqueous dispersions. These rubbers are mixed with aritificial or natural resins in order to improve the use characteristics. This procedure is generally used in the case of polychloroprene adhesives and is being increasingly used in the case of polyurethane adhesives and butadiene-acrylonitrile adhesives.

In order to increase the relatively low thermal stability of polyurethane rubber, polyisocyanates, usually triphenylmethanetriisocyanate are frequently used as reinforcing agents. The reinforcing action of isocyanates brings about the desired increase in the thermal stability, but leads to a number of disadvantages. Isocyanates have only a limited storage stability and are sensitive to water. They also make special demands on the solvent composition. The solvent may contain no active hydrogen atoms and in particular no hydroxyl groups. Isocyanates are highly toxic compounds. In addition, the most suitable polyisocyanates for the reinforcing of polyurethane rubbers, namely those based on triphenylmethane have a tendency to discolouration, both per se and in adhesives.

Adhesives reinforced with isocyanates suffer from disadvantages due to the short activatability period of the adhesive film. This means that contact adhesives, following the evaporation of the solvent, loose their stickiness, i.e. they set or harden, after a certain time, which can range between a few minutes and several hours. The stickiness can be restored by thermal activation, for example by the short-term action of infra-red radiation. In the case of certain adhesives, this activatability can last an almost unlimited period, but the tests are generally discontinued after four weeks in accordance with normal practice. However, in the case of polyurethane adhesives reinforced with isocyanate, only a limited activatability is possible, generally only up to 24 hours and at the most two days. This is naturally a disadvantage.

The object of the present invention is to improve the use characteristics, particularly the adhesiveness in heat, of contact adhesives based on polyurethane rubbers. According to the invention this is achieved in that 2.5 to 100 and preferably 5 to 60% by weight, based on the solid rubber, of a phenolate of titanium, zirconium and/or preferably aluminum are added to the rubber solutions.

In the case of reinforced contact adhesives based on the conventionally used polyurethane rubbers, e.g. Desmocoll types (Bayer AG) and Elastostic types (BASF AG), the proposal according to the invention leads to an improvement in the stickiness, the activatability is considerably increased in duration compared with the hitherto known polyurethane rubbers and discolouration is largely or completely avoided.

A significant advantage of the invention is that the metal phenolates, which are used for reinforcing the adhesive are not toxic and are not sensitive to water and organic solvents containing hydroxyl groups, unlike the case of the isocyanates hitherto used as reinforcing agents. Thus, they can also be used in the form of aqueous dispersions.

The generally resinous phenolates, are appropriately prepared by reacting the corresponding metal alkoxides with phenols, by treating the metal alkoxide with the phenol under reduced pressure, whereby the alcohol component escapes. The phenol can be constituted by phenol itself, bisphenois such as diphenylolmethanes and/or propanes, resorcinol, α- and β-naphthol, isomeric cresols or monohydric or polyhydric phenols substituted once, twice or thrice by hydrocarbon radicals having 1 to 20, preferably 1 to 12 C-atoms and together advantageously a maximum of 20 C-atoms, including those polyphenols which are obtained during condensation of phenols with oxo compounds (novolaks). The hydrocarbon radicals can be alkyl, cycloalkyl, aryl or aralkyl radicals, e.g. methyl, ethyl, propyl, the various butyl, octyl and nonyl radicals, as well as cyclohexyl and terpene radicals, the unsubstituted phenyl radical, or the phenyl radical substituted by alkyl, such as methyl, isopropyll or one of the butyl radicals, or the phenyl ethylidene radical obtained by styrenating. Compounds with cycloalkyl radicals are e.g. resinous terpene phenols. Preference is given to aluminum phenolates of polyhydric phenols.

It can be appropriate for improving the hydrolytic stability of the phenolates to stabilise them in the conventional manner with 1,3-dioxo compounds, such as acetyl acetone and in particular with acetoacetic esters of monohydric alcohols, e.g. those with 1 to 20 and preferably 1 to 4 C-atoms. The dioxo compound can be present in a quantity up to coordinative saturation, but can also be present in an even larger quantity, which then acts as a solvent.

The contact adhesives reinforced in accordance with the invention contain the conventional solvents, such as ethyl acetate, methyl ethyl ketone, toluene and/or mixtures thereof. They are two-component adhesives, in the same way as the adhesives subsequently reinforced with isocyanates. The mixture has a limited life. This processing time, which is called the pot life can be increased in the case of the adhesives according to the invention in the conventional manner by adding compounds which contain alcoholic or phenolic hydroxyl groups. For example it is possible to use hydroxyl group-containing polyester resins and preferably phenolic resins of the novolak or resol type in a quantity of up to 100, preferably 5 to 60 and more especially 10 to 45% by weight, based on the rubber. It is also possible to obtain an increase by adding alcohols, particularly low molecular weight monohydric alcohols, such as methanol, ethanol, propanol or the various butanols, which can be used e.g. in a quantity up to 20 and preferably 2 to 10% by weight, based on the rubber. The concomitant use of hydroxyl group-containing compounds, particularly phenolic resins, also improves the stickiness of the adhesive films, without there being any deterioration in the thermal stability.

The contact adhesives according to the invention are suitable for the bonding of the most varied materials, such as polyvinyl chloride, leather, natural or synthetic rubber, natural or synthetic textiles, polyurethane or glass. It is also possible to bond materials with a plasticiser content. Thus, the invention also relates to the use of the contact adhesives according to the invention for bonding materials of the most varied type.

In the following Examples parts indicates parts by weight and % percent by weight. In the Tables, the percentages always relate to solids.

PREPARATION OF METAL PHENOLATES

Phenolate A: 20.4 parts of a solution of aluminum triisobutylate in isobutanol containing 80.1% of aluminum triisobutylate or 9.9% of aluminum respectively are mixed with 14.3 parts of acetoacetic ester and 47.5 parts of 4,4'-diphenylolpropane in a reaction vessel equipped with a stirrer, thermometer and vacuum distillation device, followed by heating to 150° C. in the vacuum of the water jet pump. 21.2 parts of distillate were obtained. After a 4 hours' reaction period at 150° C., the vacuum was discontinued, followed by cooling and the dissolving of the batch during cooling in 40 parts of methyl ethyl ketone. After cooling to ambient temperature, 100 parts of a solution were obtained having a viscosity of 130 mPa.s/20° C. and a residue of 60.1%. The residue was determined by heating a 2 g sample for 1 hour at 135° C. in a drying oven.

Phenolate B: 20.2 parts of the triisobutylate solution referred in A were mixed with 14.2 parts of ethyl acetoacetic ester in the apparatus described in A, followed by the addition of 45.8 parts of para-iso-octylphenol. The mixture was then reacted for 4 hours at 150° C. in the water jet vacuum, as in A. As in A, this was followed by dissolving in 40 parts of methyl ethyl ketone, giving 100 parts of a solution which, for a residue of 60 % (1 h/135° C.) had a viscosity of 20 mPa.s/20° C.

Phenolate C: 41.3 parts of a 65.4% solution of aluminum tri-n-butylate and 57 parts of para-tert.-butyl-phenol were reacted together in the apparatus described in A and in the manner described therein for 6 hours at 170° C. in the water jet vacuum, followed by dissolving in 40 parts of cyclohexanone, as described in A. 100 parts of a solution were obtained which, in the case of a residue of 60% (1 hour/135° C.), had a viscosity of 7 mPa.s/20° C.

EXAMPLE

Adhesive test under conventional conditions

1. In each case one sample of 100 parts of an elastic, substantially linear polyurethane rubber (OH-content approximately 0.1%, density 1.23 g.cm$^3$, solution viscosity 0.2 to 0.8 Pa.s/20° C., 15% in methyl ethyl ketone—Desmocoll 400 of Bayer AG) were dissolved in a mixture of 215 parts of methyl ethyl ketone, 150 parts of ethyl acetate and 75 parts of toluene and mixed with 10 parts of phenolates A, B and C for a comparative test with 10 parts of triphenylmethanetriisocyanate (as 20% solution in methylene chloride). Bonds on flexible PVC were produced. After exposing to air and drying the adhesive film, the bonds were formed after infra-red activation for 3 seconds. After storing for 7 days, the following peel strengths were obtained.

|  | Peel strength (N.cm$^{-1}$) | |
| --- | --- | --- |
| Additive | 23° C. | 50° C. |
|  | 43 | 5 |
| Phenolate A | 69 | 43 |
| Phenolate B | 54 | 44 |
| Phenolate C | 49 | 39 |
| Triphenylmethane-triisocyanate | 50 | 37 |

2. An adhesive was prepared as in Example 1 and mixed with 10% phenolate A or 10% triphenylmethanetriisocyanate and alternatively with a modified novolak from 456 g of 4,4'-diphenylolpropane, 400 g of a solution of 280 g p-nonylphenol dialcohol in 150 g of xylene, 95 g of aqueous formaldehyde (30% bw), 50 g of xylene and 2.6 g of phosphoric acid, which have been refluxed for 3 to 5 hours while stirring. The reaction mixture had been circulated until no more water was separated, followed by removal of xylene by means of distillation until a temperature of 180° C. of the residue has been reached. Traces of solvents have been removed by means of reduced pressure. 720 g of a solid novolak have been obtained with a melting point of 107° C. Adhesive films were produced on flexible PVC and bonds were produced after storing the coated PVC for varying periods of time, following a 3 second activation by infrared radiation. As can be gathered from the following Table, the adhesives according to the invention, even in the case of activation after prolonged storage, have a substantially unchanged, or even a better peel strength, i.e. they have a long activatability

|  | Peel strength 23° C. (N.cm$^{-1}$) | | | |
| --- | --- | --- | --- | --- |
| Storage time | 24 h | 48 h | 5 d | 24 d |
| 10% phenolate A | 59 | 64 | 62 | 60 |
| 10% phenolate A, 10% novolak | 65 | 63 | 85 | 93 |
| 10% triphenylmethane-triisocyanate | 68 | 32 | 18 | 17 |
| 10% triphenylmethanetri-isocyanate, 10% novolak | 68 | 60 | 18 | 10 |

3. The polyurethane rubber solution referred to in Example 1, was provided with the additives referred to the following Table and was tested from the adhesive standpoint as described in Example 1, after 28 days or the optimum period of time. The novolak was identical with that of Example 2.

| Additives | Peel strength 50° C. (N.cm$^{-1}$) | Activatability |
| --- | --- | --- |
| 20% phenolate A | 38 | 28 d |
| 20% phenolate A + 45% novolak | 40 | 28 d |
| 10% triphenylmethanetri-isocyanate | 37 | 24 d |
| 10% triphenylmethanetri-isocyanate + 45% novolak | 39 | 24 d |
| without additive | 4 | 28 d |

4. The polyurethene rubber solution referred to in Example 1 was provided with the additives described in the following Table and tested from the adhesive standpoint as described in Example 1. The bonds were produced on the one hand after exposing to air for 20 minutes at 23° C. and on the other hand after exposing to air for 6 hours at 23° C. and subsequent infra-red activation.

|  | Exposure to air 20'/23° C., peel strength N.cm$^{-1}$ | | Exposure to air 6 h/23° C., 3 seconds IR-activation, peel strength N.cm$^{-1}$ | |
| --- | --- | --- | --- | --- |
| Additives | 23° C. | 50° C. | 23° C. | 50° C. |
| 10% phenolate A | 35 | 52 | 69 | 43 |
| 10% triphenyl-methanetriiso-cyanate | 0 | 0 | 50 | 37 |

We claim:

1. Contact adhesive comprising (a) a solution of polyurethane rubber in a conventional solvent combined with (b) 2.5 to 100% by weight of a phenolate of at least one of the metals titanium, zirconium and aluminum as reinforcing agent, the percentage figure being referred to the solid polyurethane rubber.

2. An adhesive as claimed in claim 1 wherein additionally a compound is present which contains hydroxy groups selected from the group consisting of hydroxy containing polyester resins, novolak phenolic resins, resolphenolic resins and alcohols.

3. An adhesive as claimed in claim 2, wherein the compound containing hydroxy groups is a phenolic resin.

4. An adhesive as claimed in claim 2, wherein the compound containing hydroxy groups is present in an amount up to 100% by weight, referred to the polyurethane rubber.

5. An adhesive as claimed in claim 3, wherein the phenolic resin is present in an amount in the range from 10 to 45% by weight, referred to the rubber.

6. An adhesive as claimed in claim 1, wherein the phenolate (b) is applied in an amount in the range from 5 to 60% by weight, referred to the rubber.

7. An adhesive as claimed in claim 1, wherein there is also applied a 1.3 dioxo compound.

8. An adhesive as claimed in claim 7, wherein the dioxo compound is used in an amount up to that capable of saturating the oxo groups coordinatively.

9. An adhesive as claimed in claim 1, wherein the metal phenolate is a phenolate of aluminum with a polyhydric phenol.

10. Contact adhesive comprising (a) a solution of polyurethane rubber in a conventional solvent combined with (b) 5 to 60% of an aluminum phenolate and (c) 0 to 100% of a phenolic resin, the percentages being referred to the solids of the polyurethane rubber.

11. An adhesive as claimed in claim 10, wherein the aluminum phenolate is derived from a polyhydric phenol.

12. An article comprising elements of an inorganic and/or organic nature bonded by an adhesive as claimed in claim 1.

* * * * *